(12) United States Patent
Baker et al.

(10) Patent No.: US 7,167,690 B2
(45) Date of Patent: Jan. 23, 2007

(54) RADIO COMMUNICATION SYSTEM

(75) Inventors: Matthew P. J. Baker, Canterbury (GB); Deborah L. Raynes, Horley (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 757 days.

(21) Appl. No.: 09/995,467

(22) Filed: Nov. 28, 2001

(65) Prior Publication Data

US 2002/0067309 A1 Jun. 6, 2002

(30) Foreign Application Priority Data

Dec. 2, 2000 (GB) .................................. 0029424.9

(51) Int. Cl.
*H03C 7/02* (2006.01)
*H04B 1/02* (2006.01)
*H04B 7/02* (2006.01)

(52) U.S. Cl. .................... 455/101; 455/103; 455/115.1; 455/115.3; 370/334

(58) Field of Classification Search ................ 455/101, 455/103, 115.1, 115.3, 121; 370/334
See application file for complete search history.

(56) References Cited

U.S. PATENT DOCUMENTS

| | | | | |
|---|---|---|---|---|
| RE32,789 E | * | 11/1988 | Lynk et al. .................. 455/512 |
| 5,095,535 A | * | 3/1992 | Freeburg ................. 455/278.1 |
| 5,570,411 A | * | 10/1996 | Sicher ......................... 455/450 |
| 6,067,290 A | | 5/2000 | Paulraj et al. ............... 370/329 |
| 6,192,256 B1 | * | 2/2001 | Whinnett .................. 455/562.1 |
| 6,496,520 B1 | * | 12/2002 | Acosta ....................... 370/474 |
| 6,700,919 B1 | * | 3/2004 | Papasakellariou ........... 375/130 |
| 6,831,956 B1 | * | 12/2004 | Schmidl et al. ............. 375/343 |
| 6,961,720 B1 | * | 11/2005 | Nelken ........................ 706/47 |
| 2002/0122472 A1 | * | 9/2002 | Lay ............................ 375/148 |
| 2006/0023666 A1 | * | 2/2006 | Jalali et al. ................. 370/334 |

FOREIGN PATENT DOCUMENTS

| | | |
|---|---|---|
| DE | 19824152 A | 12/1999 |
| WO | WO 93/17531 * | 1/1993 |
| WO | WO0011806 | 3/2000 |

OTHER PUBLICATIONS

Samsung electronic Co., Aug. 16, 2002.*
GB 000033 Serial No. : 09/814,383, filed on: Mar. 21, 2001, Entitled: Antenna Diversity Arrangement, Inventor: Kevin R. Boyle.

* cited by examiner

*Primary Examiner*—Matthew Anderson
*Assistant Examiner*—Tuan Pham
(74) *Attorney, Agent, or Firm*—Larry Liberchuk

(57) ABSTRACT

A radio communication system comprises a communication channel between a transmitter (108) having a plurality of antennas (110) and a receiver (114) having at least one antenna (110). In such a system the communication channel comprises a plurality of paths (112) having a range of characteristics. Data for transmission is generated by one or more applications (102) and has one or more categories assigned to it, for example by the addition of tags by a tagging block (204) indicating its importance or other requirements. Depending on the assigned categories and the characteristics of the paths (112), the data is mapped to one or more of the transmitter's antennas (110) to select a suitable transmission path (112).

14 Claims, 1 Drawing Sheet

RADIO COMMUNICATION SYSTEM

The present invention relates to a radio communication system having a communication channel comprising a plurality of paths between a transmitter and a receiver, the transmitter comprising a plurality of antennas and the receiver comprising at least one antenna. In the present specification, path is used to refer to an individual sub-channel which is resolvable within the overall radio system, and channel is used to refer to the combined totality of paths between the transmitter and the receiver.

In a radio communication system, radio signals typically travel from a transmitter to a receiver via a plurality of propagation paths, each involving reflections from one or more scatterers. Received signals from the propagation paths may interfere constructively or destructively at the receiver (resulting in position-dependent fading). Further, differing lengths of the propagation paths, and hence the time taken for a signal to travel from the transmitter to the receiver, may cause inter-symbol interference.

It is well known that the above problems caused by multipath propagation can be mitigated by the use of multiple antennas at the receiver (receive diversity), which enables some or all of the multiple propagation paths to be resolved. For effective diversity it is necessary that signals received by individual antennas have a low cross-correlation. Typically this is ensured by separating the antennas by a substantial fraction of a wavelength, although closely-spaced antennas may also be employed by using techniques disclosed in our co-pending unpublished International patent application PCT/EPO1/02750 (applicant's reference PHGB000033). By ensuring use of substantially uncorrelated signals, the probability that destructive interference will occur at more than one of the antennas at any given time is minimised.

Similar improvements may also be achieved by the use of multiple antennas at the transmitter (transmit diversity). Diversity techniques may be generalised to the use of multiple antennas at both transmitter and receiver, known as a Multi-input Multi-Output (MIMO) system, which can further increase system gain over a one-sided diversity arrangement. As a further development, the presence of multiple antennas enables spatial multiplexing, whereby a data stream for transmission is split into a plurality of sub-streams, each of which is sent via a different path (or sub-channel). One example of such a system is described in U.S. Pat. No. 6,067,290.

The performance gains which may be achieved from a MIMO system may be used to increase the total data rate at a given error rate, or to reduce the error rate for a given data rate, or some combination of the two. A MIMO system can also be controlled to reduce the total transmitted energy or power for a given data rate and error rate.

An object of the present invention is to provide a MIMO or MISO (Multi-Input Single-Output) system having improved performance.

According to a first aspect of the present invention there is provided a radio communication system having a communication channel comprising a plurality of paths between a transmitter having a plurality of antennas and a receiver having at least one antenna, wherein the transmitter comprises path characterisation means for determining at least one transmission property of each path, categorisation means for assigning a category to a set of data for transmission and mapping means responsive to said category and said at least one transmission property for determining a mapping to apply the set of data to the transmitter's antennas, thereby determining over which path or paths the data will be transmitted.

According to a second aspect of the present invention there is provided a transmitter for use in a radio communication system having a communication channel comprising a plurality of paths between a transmitter having a plurality of antennas and a receiver, wherein path characterisation means are provided for determining at least one transmission property of each path, categorisation means are provided for assigning a category to a set of data for transmission, and mapping means responsive to said category and said at least one transmission property are provided for determining a mapping to apply the set of data to the transmitter's antennas, thereby determining over which path or paths the data will be transmitted.

According to a third aspect of the present invention there is provided a method of operating a radio communication system having a communication channel comprising a plurality of paths between a transmitter having a plurality of antennas and a receiver having at least one antenna, the method comprising the transmitter determining at least one transmission property of each path, assigning a category to a set of data for transmission and determining a mapping to apply the set of data to the transmitter's antennas depending on said category and said at least one transmission property, thereby determining over which path or paths the data will be transmitted.

The present invention is based upon the recognition, not present in the prior art, that by taking account of the properties of each of the sub-channels the properties of the overall communication link can be optimised.

Embodiments of the present invention will now be described, by way of example, with reference to the accompanying drawings, wherein.

In the drawings the same reference numerals have been used to indicate corresponding features.

Figure 1:
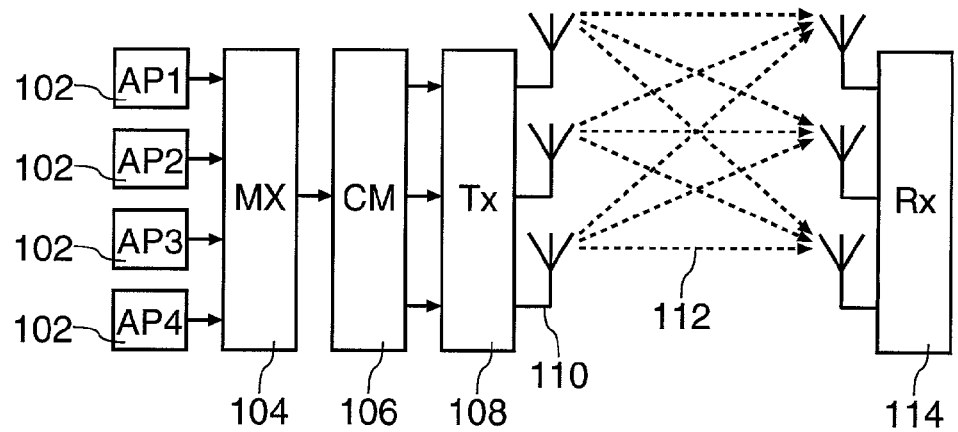
FIG. 1 is a block schematic diagram of a known MIMO radio system.

FIG. 1 illustrates a known MIMO radio system. A plurality of applications 102 (AP1 to AP4) generate data streams for transmission. An application 102 could also generate a plurality of data streams. The data streams are combined by a multiplexer (MX) 104 into a single data stream, which is further processed by a coding and mapping block (CM) 106. The CM block may apply space-time coding to provide a mapping between data symbols to be transmitted by a transmitter (Tx) 108, together with suitable forward error correction, and multiple transmit antennas 110. The Forward Error Correction (FEC) which is applied by the CM block must therefore have sufficient error-correcting ability to cope with the entire MIMO channel, which comprises a plurality of paths 112. For simplicity of illustration only direct paths 112 between antennas 110 are illustrated, but it will be appreciated that the set of paths will typically include indirect paths where signals are reflected by one or more scatterers.

A number of space-time coding techniques are known in the prior art and may be employed by the coding and mapping block 106. These may further include diversity and beam forming techniques to aid the selection of radio paths to the receiver. Examples of suitable techniques include but are not limited to those described in chapters 2, 5 and 8 of "Space-Time Processing for CDMA Mobile Communications", van Rooyen et al, Kluwer Academic Publishers 2000.

A receiver (Rx) 114, also provided with a plurality of antennas 110, receives signals from the multiple paths which it then combines, decodes and demultiplexes to provide respective data streams to each application. Although both the transmitter 112 and receiver 114 are shown as having the same number of antennas, this is not necessary in practice and the numbers of antennas can be optimised depending on space and capacity constraints. Similarly, the transmitter 108 may support any number of applications (for example, a single application on a voice-only mobile telephone or a large number of applications on a PDA).

A problem with such a known MIMO system is that it takes no account of the fact that the various paths 112 between transmitter 108 and receiver 114 will differ in their impulse responses, resulting in differences in Signal-to-Noise Ratio (SNR) and time delay. The number of paths 112 which can be used is restricted by the quality of available paths.

In a system made in accordance with the present invention, a data stream is mapped to the different transmit antennas 110 according to the differing requirements of individual portions of data.

In order to implement such a system, prior knowledge of the characteristics of the different paths 112 is required. This knowledge may be obtained by transmitting pilot bits from each antenna to enable the receiver 114 to conduct channel estimation in a known manner. The channel estimate may then be transmitted back to the transmitter 108 to enable it to determine how to assign and code data for the different antennas 110. Alternatively, the estimate could be derived from bit or block error rates of data previously received via the different radio paths 112 or by other appropriate techniques.

If the uplink and downlink channels are known to be at least approximately reciprocal, for example in a Time Division Duplex system having a coherence time greater than the closed-loop feedback delay, the channel estimation may be performed by the transmitter 108 on the basis of known pilot information or similar received from the receiver 114.

Data which requires a high Quality of Service (QoS) in terms of error rate, or simply requires the highest available bit rate, may be mapped to the transmit antennas 110 in such a way as to make use of one or more paths 112 in the radio channel offering the best SNR (or which require the lowest transmit power for the required SNR). Data requiring a lower QoS in terms of error rate may be mapped to a path or paths 112 in the radio channel offering a lower value of SNR.

The distinction between different data bits with differing requirements may be made on the basis of the application from which the data emanates, for example a real-time high-quality video link may produce data to be transmitted which requires a lower error rate than voice data. In this case, instead of multiplexing the data streams from the different applications together above or at the physical layer in the transmitter, the streams would be kept separate until the process of mapping their respective data bits to the transmit antennas.

Figure 2:
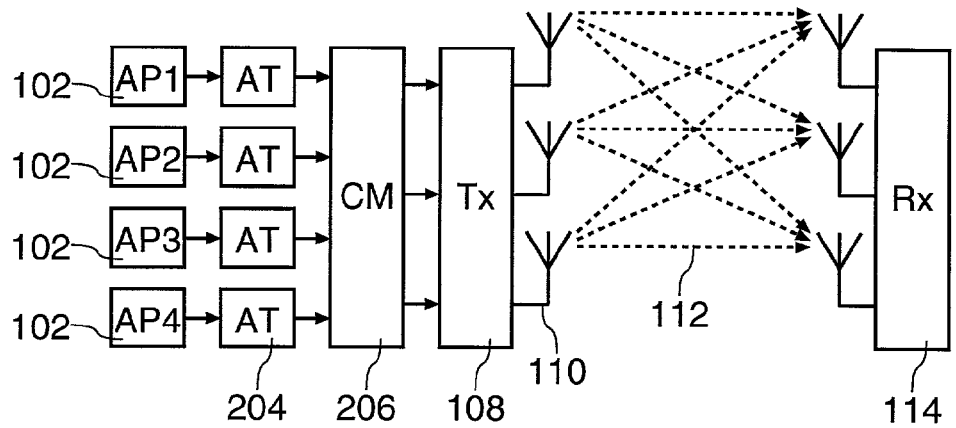
FIG. 2 is a block schematic diagram of a MIMO radio system made in accordance with the present invention.

A modified MIMO system implementing this function is shown in FIG. 2. The multiplexer 106 is now replaced by a plurality of tagging blocks (AT) 204, each connected to an application 102, which add a tag to the data from the respective application 102 providing information about its QoS requirements. The tagging blocks 204 may alternatively use other means for associating information regarding QoS requirements with the data; for example data with different QoS requirements may be delivered to the physical layer at different time instants or on different transport channels or to different ports. This QoS information is then used by a modified coding and mapping block 206 which adjusts the mapping to meet the QoS requirements so far as possible by matching them to the properties of the radio paths 112.

The system of FIG. 2 could be modified if multiple applications had the same or similar requirements. In this case, data from these applications could be multiplexed above the physical layer.

Instead of, or in addition to, treating data from different applications differently, different data bits from a particular application could be mapped to the transmit antennas 110 in such a way as to use particular radio paths according to differing requirements of the particular bits. As a typical example, a stream of data from a voice codec could have coded bits assigned to a range of classes depending on their level of importance. The most important bits could be transmitted via the highest quality paths 112, while the less important bits could use lower quality radio paths 112.

Figure 3:
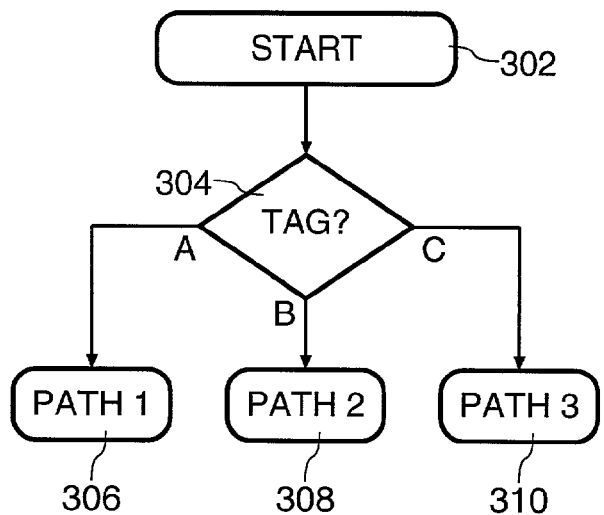
FIG. 3 is a flow chart illustrating a method of operating a MIMO radio system in accordance with the present invention.

FIG. 3 is a flow chart illustrating this method of operating a MIMO system. The process starts, at step 302, when an application 102 running on the transmitter 108 has data for transmission. The application tags segments of data depending on their requirements, and the value of this tag is checked at step 304. In this example, if the tag is 'A' (representing the most important data) the data is transmitted via a first path 112, at step 306, where the first path is a high quality path. Similarly, if the tag is 'B' (representing data of medium importance) the data is transmitted via a second path 112, at step 308, where the second path is a medium quality path. Finally, if the tag is 'C' (representing data of low importance), the data is transmitted via a third path 112, at step 310, where the third path is a low quality path.

As a further variation, the level of error control coding applied to the data could be varied depending on the quality of the radio paths 112 from each antenna 110. For example, a lower level of error control coding (or none) could be used for data using the higher-quality paths 112. This in turn could reduce the overall amount of information being transmitted and therefore enable the transmitter power to be reduced, or alternatively a higher data rate could be supported.

Similarly, the modified coding and mapping block 206 may also set other transmission parameters, such as the modulation scheme and/or transmission power, to be different for the different sets of data, depending on the category assigned to the data and/or the quality of the radio paths 112 from each antenna. For example, a higher-order modulation scheme and/or a lower transmission power could be used for data mapped to the higher-quality paths 112. Although the CM block 106 is shown as a single block, the operations of setting transmission parameters (possibly including coding) and mapping may be performed either in one functional block or in separate blocks. Additionally, the operation of mapping may be performed independently to that of setting transmission parameters, or as part of a joint optimisation process. If performed independently, the mapping may still take into account the available set of transmission parameters.

A range of other variations on the basic scheme are also possible. For example:

The total transmission power could be divided between the multiple transmit antennas in such a way as to equalise the received SNR from each of the paths.

The data bits could be mapped according to the different delays of the various radio paths 112, with more important or more urgent bits (e.g. closed-loop power control commands where the loop delay is critical) being transmitted on the shorter paths.

Data from a particular application could be mapped to those paths 112 which have equal or similar delays, in order to eliminate inter-symbol interference.

In each case, one or more of the priority, error rate and delay required for each set of data bits delivered to the coding and mapping block 206 for transmission by the transmitter 108 could be indicated to the physical layer by means of additional "tag" bits or by any suitable alternative means, such as those described above.

An advantage of a system made in accordance with the present invention over known systems is that it enables the radio channel to be better suited to the requirements of the data which is being transmitted. This may in turn result in a reduced overall transmit power, or an increase in the achievable data rate.

The present invention is particularly advantageous for multi-mode transceivers which are designed to operate using multiple radio protocols. Such appliances are likely to receive data from widely differing applications. According to the present invention, this data may be mapped to radio paths of suitable quality using one or more of the radio protocols supported by the appliance.

A system made in accordance with the present invention may be enhanced by using a plurality of spatially-separated receivers or transmitters. A typical example of this would be where a single mobile station maintains communication links with a plurality of base stations. A downlink data stream is divided, at a network layer level, among the base station transceivers such that each supports part of the downlink data stream to a single mobile station. By making the division in the manner described above, the robustness of the overall connection will be enhanced. The plurality of data streams from the base stations are received by the mobile, and reassembled at a network level within the terminal to provide the complete application data. Uplink transmissions could be primarily to a single base station or divided between all of the base stations depending on capacity and other requirements.

As such a mobile moves between base stations it will continuously come into range of new base stations and go out of range of other base stations, although overall it maintains continued connections with several base stations. The handover between individual base stations can be either hard or soft, but the overall effect for the mobile is a very soft handover since it is always in stable communication with several base stations.

The present invention has been described above in the context of a MIMO system. However, it may also be applied to the situation where the receiver 114 has only one antenna 110 but the transmitter 108 has a plurality of antennas 110. In such a system there are still advantages in targeting different items of data for transmission over different paths 112.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel comprising a plurality of paths between a transmitter having a plurality of antennas and a receiver having at least one antenna, wherein the transmitter comprises:

path characterization means for determining at least one transmission property of each path of said plurality of paths, data categorization means for determining and assigning a data quality category to a set of data for transmission, said data categorization means being adapted to assign different categories to different segments of the set of data from an application; and mapping means responsive to said path characterization means and said data categorization means for determining a mapping to apply the set of data to the transmitter's plurality of antennas such that the set of data is transmitted over a path or paths in which the determined data quality of the set of data corresponds to the at least one transmission property of the path or paths, thereby determining over which path or paths the set of data will be transmitted.

2. A system as claimed in claim 1, wherein the receiver comprises means for performing channel estimation and means for signaling details of the output of the channel estimation to the path characterization means.

3. A transmitter for use in a radio communication system having a communication channel comprising a plurality of paths between a transmitter having a plurality of antennas and a receiver, wherein path characterization means for determining at least one transmission property of each path of said plurality of paths, data categorization means for determining and assigning a data quality category to a set of data for transmission, said data categorization means being adapted to assign different categories to different segments of the set of data from an application; and mapping means responsive to said path characterization means and said data categorization means for determining a mapping to apply the different portions of the set of data to respective ones of the transmitter's plurality of antennas such that a data portion transmitted over a path having a determined data quality corresponds to the at least one determined transmission property of the path, thereby determining over which path or paths the set of data will be transmitted.

4. A transmitter as claimed in claim 3, wherein data for transmission may be provided from a plurality of sources and wherein the data categorization means is adapted to assign said data quality category depending on the source of the data.

5. A transmitter as claimed in claim 3, wherein the data categorization means is adapted to assign the different categories to the respective segments of the data from an application depending on at least one of (i) their relative importance, (ii) required quality of service, (iii) data rate, (iv) tolerable transmission delay and (v) tolerable error rate.

6. A transmitter as claimed in claim 3, wherein the path characterization means is adapted to determine said at least one transmission property comprising at least one of a delay, a signal-to-noise ratio, and a required transmission power for a given signal-to-noise ratio or error rate for each path.

7. A transmitter as claimed in claim 3, wherein parameter selection means are provided for setting at least one transmission parameter relating to the data depending on at least one of the path (or paths) assigned for transmission of the data and the data quality category assigned to the data.

8. A transmitter as claimed in claim 7, wherein a transmission parameter specifies the type of error control coding added to the data.

9. A transmitter as claimed in claim 7, wherein a transmission parameter specifies the modulation scheme to be used for transmission of the data.

10. A transmitter as claimed in claim 7, wherein a transmission parameter specifies the transmission power of each of the antennas, thereby enabling a particular signal-to-noise ratio to be achieved for at least one signal path.

11. A transmitter as claimed in claim 3, characterized by being distributed at a plurality of spatially-separated sites, each site comprising at least one antenna.

12. A transmitter as claimed in claim 3, wherein the path characterization means are adapted to determine properties of the paths at least partly from measurements made by the receiver and signaled to the transmitter.

13. A method of operating a radio communication system having a communication channel comprising a plurality of paths between a transmitter having a plurality of antennas and a receiver having at least one antenna, the method comprising the acts of:

(i) the transmitter determining at least one transmission property of each path, (ii) assigning different categories to different segments of a set of data from an application for transmission, and (iii) determining a mapping to apply the set of data to the transmitter's plurality of antennas such that different portions of the set of data are transmitted over a respective path such that a determined data quality of said data portion corresponds to the determined at least one transmission property of the path, thereby determining over which path or paths the data will be transmitted.

14. A method as claimed in claim 13, characterized by transmitting data requiring a higher quality of service over a higher quality sub-channel and further transmitting data requiring a lower quality of service over a lower quality sub-channel.

* * * * *